Aug. 22, 1939.  J. T. MISIAK ET AL  2,170,153
WAFFLE IRON
Filed Nov. 5, 1937
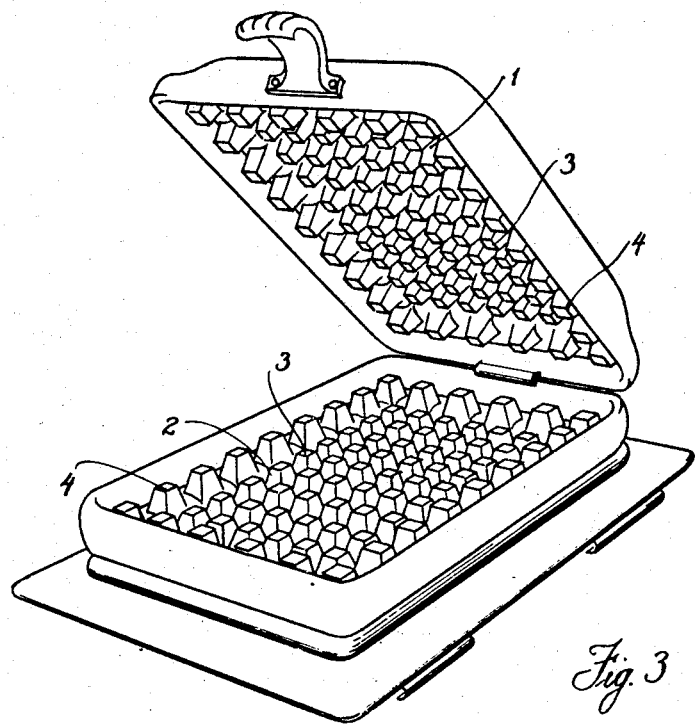
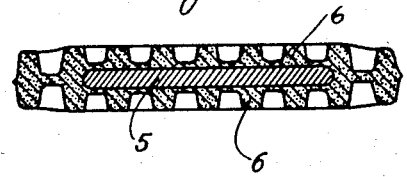
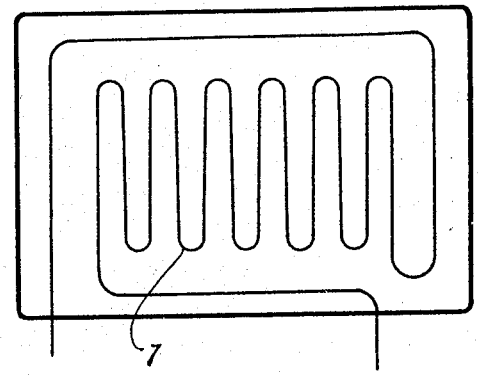

Patented Aug. 22, 1939

2,170,153

UNITED STATES PATENT OFFICE 2,170,153

WAFFLE IRON

Joseph T. Misiak and Wesley D. Mitchell, Chicago, Ill.

Application November 5, 1937, Serial No. 172,933

8 Claims. (Cl. 219—19)

The present invention pertains to certain features of novelty and betterment, both structural and functional, in waffle irons or molds by means of which an uncoked edible may be introduced into the waffle-mold in association with the batter and the two cooked properly simultaneously and in the same period of time.

It is desirable that when chopped meat constitutes such waffle filling, its juices shall be retained therein to preserve the flavor of the cooked meat and this condition is met in using the new appliance.

Inasmuch as the present unique waffle-mold may be so employed with a layer or filler of uncooked comminuted meat, the cooked product could be more or less aptly termed a "waffleburger"

An object of the invention is to provide a device of the character described which is simple in structure, which is economical in the cost of production, which operates efficiently, and which produces an edible product pleasing in taste and attractive in appearance.

A further aim of the invention is to supply an apparatus of the type referred to in which all edible elements heated therein are adequately and correctly cooked and all flavors retained even though such elements differ substantially in various respects.

An added purpose of the invention is to make available an improved waffle-iron which will cook a waffle having a meat layer embedded therein and not reaching to the edges of the waffle so that the meat is completely sealed therein.

In order that the above-stated and other objects may be attained and in order that those skilled in this art may fully understand the invention, a present preferred embodiment of the same has been illustrated in the accompanying drawing forming a part of this specification and to which reference should be made in connection with the following detailed description, and for simplicity the main view of the waffle-iron has been shown in perspective in open condition and another figure of the drawing illustrates the finished waffle in cross-section.

In this drawing—

Figure 1 is a perspective view of the new waffle-iron in open relation to present its internal appearance;

Figure 2 is a sectional or plan view of the arrangement of one of the electrical heating-elements; and Figure 3 is a vertical cross-section through the waffle containing the layer of cooked meat.

As is clearly depicted in the drawing, the waffle-iron comprises upper and lower mold-sections 1 and 2, respectively, hinged together at the rear, as is common in appliances of this kind, so that the mold may be opened and closed with ease and facility for the introduction of the uncoked ingredients of the waffle and for the removal of the cooked waffle.

As is usual and customary in waffle-molds, each of the separable upper and lower parts has a plurality of inwardly-extended projections which are disposed, in the closed condition of the waffle-iron, in register with those of the other or companion part of the mold.

In the present instance, each such waffle-mold section has a border or outside row of such inwardly-disposed protuberances or humps 4 around the entire mold part, and inwardly beyond such marginal row of projections, each mold-member has a relatively-large number of smaller spurs 3 arranged in longitudinal and transverse rows, each such diminished stud or boss 3 being not only smaller in cross-section than the border projections 4, but also shorter than the latter to provide space in the closed mold between them for the reception of the layer of chopped meat.

As is shown, in any unit area there are more of the projections or bosses 3 than there are of the parts 4 in a corresponding area.

Studs 3 in each mold-portion provide a greater heating surface and a greater body of metal than would be present were the corresponding area equipped with projections like those around the border.

To cook the combined or associated meat-pattie and its encasing waffle-batter requires more heat than that needed to properly cook the parts of the waffle unsupplied with such filling.

Accordingly, each of the mold-sections 1 and 2 is supplied in the usual way with a suitable electric-resistance heating-element 7 bent or shaped to supply the meat-charged part of the batter in the mold with more heat per unit of area than that imposed on the remainder of the batter; that is to say, the heating is unequal being greater for the central part of the mold than around its border.

In other words, the number and sizes of the inwardly-directed studs is directly related to the manner of coiling or bending the heating-member 7 to fully cook all parts of the waffle during the same period of time.

In use, a portion of the batter for a waffle is introduced into the lower section of the novel waffle-iron, whereupon the layer of chopped meat is laid on top of the shorter projections or studs 3 in such lower mold-part, and then the remainder of the batter is poured in.

The top section of the mold is then swung down into position on the lower section and the contents of the mold are allowed to cook under the different degrees of heat imposed until all parts of the filled waffle are correctly and properly cooked, the completed waffle being then removed and comprising a waffle proper 6 and its encased meat-filler 5.

Those acquainted with this art will readily understand that the instant invention, as defined by the appended claims, which should be interpreted as generically as the state of the prior art will permit, is susceptible of various embodiments and that the structure herein set forth is subject to change and modification without departure from the heart and essence of the invention and without the loss or sacrifice of any of its substantial benefits and advantages.

We claim:

1. A waffle-iron having separable mold-plates with spaced inwardly-extended projections, the more marginal ones of said projections of one of said plates being longer and larger than its more central projections, whereby the latter provide a space for a waffle filling-material, and an electric-heater associated with each of said mold-plates to heat the same, said heater of said one plate being arranged to provide its projections forming said filling material space with more heat and at a higher temperature per unit of adjacent food mass than it provides to the remainder of its said projections, whereby all portions of the waffle may be properly cooked in the same time period.

2. A waffle-iron having separable mold-plates with spaced inwardly-extended projections, the more marginal ones of said projections of each of said plates being longer and larger than their more central projections, whereby the latter provide a space for a waffle filling-material, and an electric-heater associated with each of said mold-plates to heat the same, each said heater being arranged to provide the projections forming its filling-material space with more heat and at a higher temperature per unit of adjacent food mass than it provides to the remainder of its projections, whereby all portions of the waffle may be properly cooked in the same time period.

3. A waffle-iron having separable mold-plates with spaced inwardly-extended projections, the more marginal ones of said projections of one of said plates being longer than its more central projections, whereby the latter provide a space for a waffle filling-material, said more central projections defining said filling space being more numerous per unit area of adjacent food mass than the remaining projections, and an electric-heater associated with each of said mold-plates to heat the same, said heater of said one plate being arranged to provide its projections forming said filling-material space with more heat and at a higher temperature per unit of adjacent food mass than it provides to the remainder of its said projections, whereby all portions of the waffle may be properly cooked in the same time period.

4. A waffle-iron having separable mold-plates with spaced inwardly-extended projections, the more marginal ones of said projections of each of said plates being longer than their more central projections, whereby the latter provide a space for a waffle filling-material, said more central projections of each plate defining said filling space being more numerous per unit area of adjacent food mass than the remaining projections, and an electric-heater associated with each of said mold-plates to heat the same, each said heater being arranged to provide its projections forming said filling-material space with more heat and at a higher temperature per unit of adjacent food mass than it provides to the remainder of its projections, whereby all portions of the waffle may be properly cooked in the same time period.

5. A waffle-iron having separable mold-plates with spaced inwardly-extended projections, the more marginal ones of said projections of one of said plates being longer than its more central projections, whereby the latter provide a space for a waffle filling-material, said more central projections defining said filling-space comprising a greater body of metal per unit area of adjacent food mass than that of the corresponding area of the other projections, and an electric-heater associated with each of said mold-plates to heat the same, said heater for said one plate being arranged to provide its projections forming said filling-material space with more heat and at a higher temperature per unit of adjacent food mass than it provides to the remainder of its said projections, whereby all portions of the waffle may be properly cooked in the same time period.

6. A waffle-iron having separable mold-plates with spaced inwardly-extended projections, the more marginal ones of said projections of each of said plates being longer than their more central projections, whereby the latter provide a space for a waffle filling-material, said more central projections defining said filling-space comprising a greater body of metal per unit area of adjacent food mass than that of the corresponding area of the other projections, and an electric-heater associated with each of said mold-plates to heat the same, each said heater being arranged to provide its projections forming said filling-material space with more heat and at a higher temperature per unit of adjacent food mass than it provides to the remainder of said projections, whereby all portions of the waffle may be properly cooked in the same time period.

7. The waffle-iron set forth in claim 1 in which said projections defining said filling-space are more numerous per unit area of adjacent food mass than the remaining projections and in which said projections defining said filling-space comprise a greater body of metal per unit area of adjacent food mass than that of the corresponding area of the other projections.

8. The waffle-iron set forth in claim 2 in which said projections defining said filling-space are more numerous per unit area of adjacent food mass than the remaining projections, and in which said projections defining said filling-space comprise a greater body of metal per unit area of adjacent food mass than that of the corresponding area of the other projections.

JOSEPH T. MISIAK.
WESLEY D. MITCHELL.